Figures 1, 2:
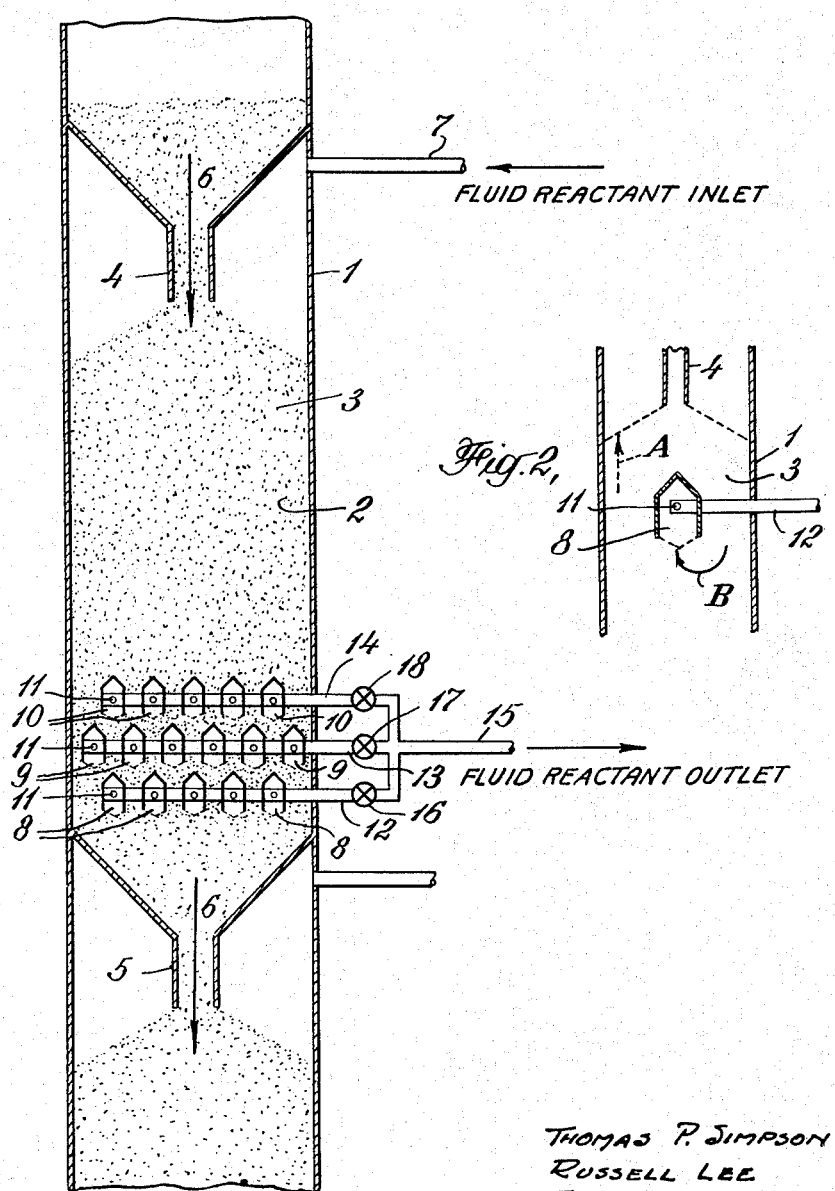

April 6, 1948.  T. P. SIMPSON ET AL  2,439,348
METHOD AND APPARATUS FOR CONVERSION OF HYDROCARBONS
Filed Sept. 21, 1943  2 Sheets-Sheet 1

FLUID REACTANT INLET
FLUID REACTANT OUTLET

THOMAS P. SIMPSON
RUSSELL LEE
FREDERICK E. RAY
INVENTORS

BY
ATTORNEY.

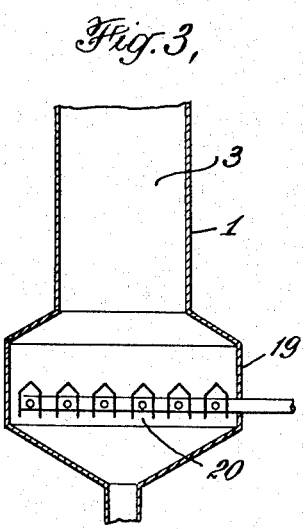
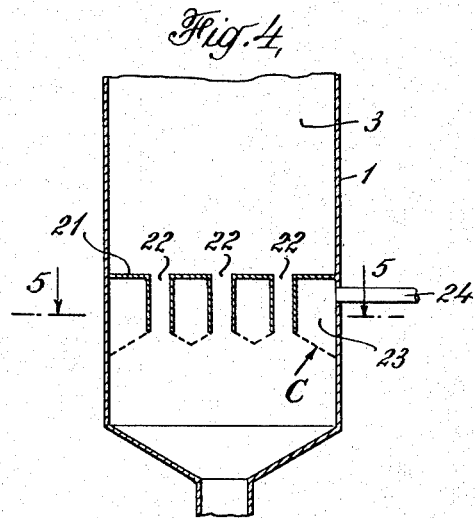
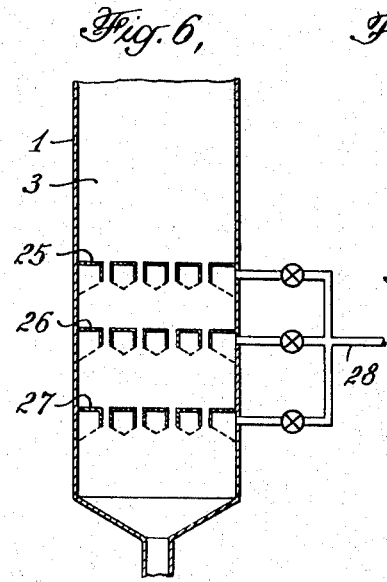
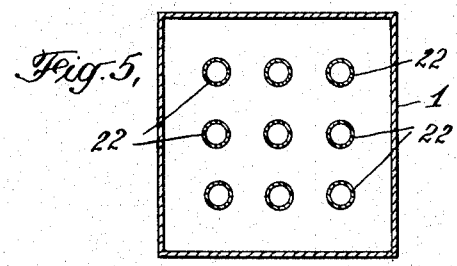
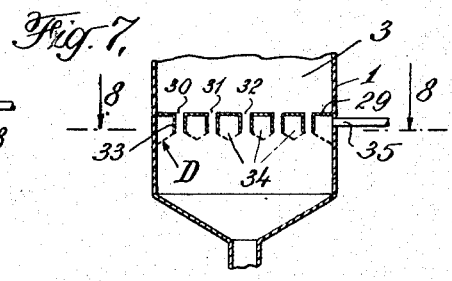
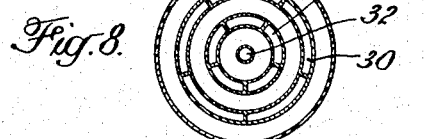

Patented Apr. 6, 1948

2,439,348

UNITED STATES PATENT OFFICE 2,439,348

METHOD AND APPARATUS FOR CONVERSION OF HYDROCARBONS

Thomas P. Simpson, Woodbury, and Russell Lee and Frederick E. Ray, Mantua, N. J., assignors to Socony-Vacuum Oil Company, Incorporated, a corporation of New York Application September 21, 1943, Serial No. 503,188

7 Claims. (Cl. 196—52)

As is well known hydrocarbons may be converted by contacting them at appropriate conditions with adsorptive contact masses. Such a process is the catalytic vapor phase cracking of gas oil to gasoline in the presence of particle-form contact masses of the general nature of clays. For example, gas oil vapors at temperatures in the neighborhood of 850° F., in the presence of such a contact mass, may be cracked to yield around 40% by volume of gasoline, a few per cent of permanent gases, and a small amount of coke which is deposited upon the contact mass, the remainder of the charge being largely unaffected and reappearing as a gas oil of a nature substantially similar to that which was charged. The deposit of coke reduces the activity of the contact mass, and periodic regeneration is required. Many installations hold the contact mass in place and effect regeneration in situ. More recently there have been developed processes in which the particle form contact mass flows in a stream through a zone where it is contacted with hydrocarbons and a reaction is continuously carried out, and then through a zone in which regeneration is continuously carried out. This invention has to do with processes of this latter type.

The contact masses used in such processes partake generally of the nature of clays or adsorptives, and include natural clays such as fuller's earth, refined natural clays, acid treated clays, synthetic associations of alumina and silica approximating clays, similar adsorptive synthetic materials such as gels of alumina and/or silica, and co-precipitated gels of these and other materials, any of which may or may not have added material such as metallic oxide, acids, etc., incorporated in or carried in the base contact mass for special purposes in connection with the contemplated reaction.

The reactions which may be carried out are most commonly cracking, reforming and similar operations, but may be alkylation, dealkylation, hydrogenation, dehydrogenation, isomerization, polymerization, oxidation, and the like.

A very efficient moving contact mass type of catalytic conversion utilizes the contact mass in the form of a moving, compact bed. In this operation, the more usual procedure at present is to flow the reactant countercurrent to the downwardly moving contact mass. In such countercurrent flow, it is desirable to remain below certain limiting flow rates with regard to the reactant, both to avoid uneven flow through the bed, and to avoid actual disruption of the bed, particularly at reactant disengaging surfaces. However this upper limit of reactant velocity within the bed imposes a limiting throughput or space velocity of reactant which is a needless bar to flexibility of operation.

This invention has for its object the provision of a process for the conversion of hydrocarbons in the presence of a moving particle-form solid contact mass material in which the fluid reactants flow concurrently with the contact mass material under such proportioning and control as to effect proper and efficient utilization of the contact mass material.

The operation contemplated may be understood more readily from consideration of the drawings attached to this specification, Figure 1 of which shows in diagram form a single stage of a reactor operated in the fashion under discussion. This may represent either a regeneration zone or a reaction zone, since the considerations of fluid reactant velocity, pressure drop, and the like are the same for both; or it may represent any one of the stages in either a multistage reactor or a multistage regenerator.

The other figures of the drawings are Figure 2, a diagram used in explanation, and Figures 3, 4, 5, 6, 7, and 8 which are utilized to show possible modifications of structure. All of these drawings are highly diagrammatic in form.

Turning to Figure 1 of the drawing, there is shown a shell 1, defining and enclosing a reaction space 2, in which there is maintained a moving compact column of particle-form contact mass material 3, supplied through pipe 4 and removed through pipe 5. The contact mass material moves downwardly as indicated by arrow 6. Fluid reactant is admitted to the reactor by pipe 7 into the free space above the surface of the contact mass column. Near the bottom of the contact mass column there are a number of inverted troughs 8, 9, 10 extending transversely of the column in a direction perpendicular to the section plane of the drawing. Each trough 8, 9, 10 connects through orifices 11 with a reaction product outlet manifold 12, 13, 14. Fluid reactant entering through pipe 7 passes downwardly through the contact mass column and into collector troughs 8, 9, 10.

Operation in this fashion has several advantages. First it permits the use of any desirable space velocity of fluid reactant, since there is available not only the normal capabilities arising from variation of reactant flow without change of depth of bed throughout a range wider than possible with countercurrent flow, but also the possibility of ready variation of bed depth.

Most interesting, however, is the capability of operation at relatively high rates of pressure drop per foot of linear passage through contact mass. The ability to use these gives rise to an ability to control diffusion and results related thereto to a degree not heretofore realized in processes of this kind and this feature differentiates over those processes heretofore proposed which have utilized concurrent flow in lower pressure drop ranges.

In order to take advantage of the higher throughputs allowed with use of higher pressure drops, certain features are necessary, an understanding of which may be gained by discussion of the small diagram shown in Figure 2. In this diagram, 1 is again the reactor shell, 4 the feed pipe for contact mass, 3 the column of contact mass within the reactor and 8 is a single collector or distributor trough attached to pipe 12. In the older type of operation, while the contact mass is flowing downwardly, reactant would be introduced through pipe 12 into the space under 8, would pass out into the contact mass and would be liberated from the contact mass column after passing upwardly therethrough into the space above the surface of the contact mass in the reactor. The amount of material which could be flowed in this manner without disruption of the column of contact mass would be determined by the pressure drop or conversely by the linear velocity of reactant within contact mass in that last portion of the contact mass immediately below the top boundary of the column. In other words, it would be the pressure drop or velocity in the region indicated by the arrow "A." Now let us assume that with the contact mass still flowing downwardly, we flow the reactants concurrently with the contact mass. The limiting rate of flow of reactant is determined, when using an open disengaging surface, that is, one wherein the contact mass assumes its own surface and is not confined by a screen or the like, by the pressure drop or conversely by the velocity in the last portion of the path of the reactant within the contact mass, that point, for example, indicated by the arrow "B." From this, it may readily be seen that when the area of the disengaging surface under trough 8 is no greater than the area of the disengaging surface to which arrow "A" leads, then no more reactant may be flowed concurrently than may be flowed countercurrently, since the characteristics of flow at the point where reactant flow may disrupt the contact mass body are substantially the same. If the area under trough 8 is substantially less than the upper surface of the contact mass column, substantially less reactant may be flowed concurrently than countercurrently, otherwise the disengaging surface to which arrow "B" points would be disrupted by turbulence or boiling and by an actual carrying away of particles with reactants. Consequently, in order to take advantage of the possibilities of high throughputs, available with concurrent flow, while still using unrestrained or unscreened disengaging surface, arrangements must be made whereby the total disengaging surface area is substantially greater than the cross sectional area of the column of solid contact mass material in the reactor.

Returning to Figure 1, it will be noted that such arrangements have been made in that there have been provided several series of collector troughs, viz., 8, 9, and 10 under which total disengaging surface area is substantially in excess of the cross sectional area of the contact mass column. Each of the collector troughs in each of the several levels is manifolded to provide a separate reactant collector pipe 12, 13, 14 for each level, these collector pipes being combined into a single fluid reactant outlet 15. Another feature here presents itself for attention. Should we attempt to operate a multi level collector with no more structure than has been discussed, it will be obvious that an attempt will be made by the reactants to pass preferentially into the collector troughs 10 in the upper level, the preference decreasing as the reactant proceeds down through the several collector trough levels. In order to avoid this, a series of valves 16, 17, 18 are installed on each of the several level manifolds as shown. These valves are then so adjusted as to secure even flow through all of the several levels. By even flow we do not mean flow equal in amount, but rather such flow in the collector troughs of each level as will give like disengaging conditions below each trough. In practice, we have found that if the proportioning of flow is such that the flow in all levels above the bottommost is about equal, and the flow of any one of such levels is approximately 80-85% of that afforded at the bottommost level, substantially equal conditions of disengagement will occur. This desirable condition may be obtained in several ways. It may be obtained by a series of throttling valves on all lines, or the valve 16 may be dispensed with and 17 and 18 adjusted to balance the reactant offtake at such levels against the free offtake from the bottommost level or the job may be done more or less permanently by the establishment of orifices or similar flow resistance devices of proper size in the several lines.

Figures 3 to 8 inclusive are concerned with modifications of structure, with optional constructions which may be used for the same purpose as that shown in Figure 1. For example, in Figure 3, the reactor shell 1 enclosing the contact mass column 3 may be enlarged in cross section near its base as at 19, to afford room for a single level of collector troughs 20 whose total area is sufficiently great to provide for the maximum design reactant flow.

In Figure 4 a very simple construction is shown which affords a disengaging surface substantially equal to the cross sectional area of the column. In Figure 4, 1 is the reactant shell and 3 the contact mass column; near the bottom of the shell there is provided a partition plate 21, from which there depends a plurality of contact mass flow pipes 22. These pipes extend for some little distance below plate 21 before their contents are discharged into the bottom portion of the reactor. In this case the disengaging surface is the surface designated by the arrow "C," the reactants being released from the solid at this surface to be collected in space 23 and removed through outlet pipe 24.

Figure 5 is a cross section of the structure of Figure 4 taken at the level indicated showing how the various pipes 22 must be substantially uniformly distributed with respect to cross section of the reactor column. The device of Figure 4, alone, does not in itself offer any particular augmentation of disengaging surface area above the cross sectional area of the column. For designs where a considerable increase is desired, the structure shown in Figure 4 may be utilized in a multiple level design, as indicated in Figure 6, wherein again 1 is a reactor shell, 3 the contact mass column and 25, 26, and 27 are a series of plates with dependent pipes, of the same nature as shown in Figure 4, the whole being arranged in a manner similar to that of the collector troughs in Figure 1, each disengaging level being similarly manifolded and valved into a single reactant outlet 28. Another version of reactant disengaging space construction similar in its essentials to that of Figure 4, but particularly preferable in reactors of circular cross section wherein it is sometimes difficult to secure adequate uniformity of contact mass flow with the plate and pipe arrangement of Figure 4, is shown in Figure 7, a cross section of which is shown in Figure 8, the two of which should be read together for complete understanding. In this construction, 1 again represents the reactor shell and 3 the contact mass column, while 29 is a partition plate pierced by appropriate orifices arranged in an annular concentric fashion, as shown by items 30, 31 and 32 in Figure 8. Each orifice has downwardly extending vertical walls 33, and the whole structure serves again to establish a disengaging surface designated by an arrow "D" below a collector space 34 connected to the reactant outlet 35. This structure may also be utilized as a multiple level, large area, disengaging structure in a manner similar to that previously explained in connection with Figure 6 and Figure 1.

All of the structures herein discussed have a single feature in common, namely, the provision of a method whereby reactants may be flowed concurrently with a downwardly moving column of particle form solid contact mass under conditions tending to keep that column substantially compact and under conditions wherein a disengaging surface is provided within and near the bottom of said column which disengaging surface is so proportioned to permit the passage of large amounts of reactant without disruption of the contact mass column and which surface usually and preferably is of substantially greater area than the cross sectional area of the contact mass column.

In this specification the term "contact mass column" has been utilized and we have spoken of its cross sectional area. In practically all cases the contact mass column will be uniform in cross section throughout its length. However in cases different designs are utilized in which constriction or enlargement of the contact mass column is brought about for some purpose or another, the term "cross sectional area" is intended to mean average cross sectional area, or in some few specialized cases, the minimum cross sectional area of the column of contact mass material exclusive of the internal area occupied by heat transfer tubes, baffling structure, supporting structure of various kinds inside the reactor case, and other items occupying space which is not occupied by contact mass.

The term "disengaging surface" has likewise been used and as used herein is intended to mean the surface (projected) of the contact mass material bounding a free space into which free space reactant may escape to be separated from the adjacent contact mass material.

We claim:

1. That method for the conversion of hydrocarbons in the presence of a particle form solid contact mass material which comprises moving the contact mass through a confined reaction zone as a compact downwardly flowing column, passing reactants at reaction conditions longitudinally through said column and concurrently therewith, and separating reactant from contact mass near the bottom of said column, in which the reactants are separated from contact mass at a disengaging surface located within said column the total area of which disengaging surface is substantially greater than the cross sectional area of the said column.

2. That method for the conversion of hydrocarbons in the presence of a particle form solid contact mass material which comprises moving the contact mass through a confined reaction zone as a compact downwardly flowing column, passing reactants at reaction conditions longitudinally through said column and concurrently therewith, and separating reactant from contact mass near the bottom of said column, in which the reactants are separated from contact mass at a disengaging surface located within said column the total area of which disengaging surface is substantially greater than the cross sectional area of the said column and in which the disengaging surface is distributed at a plurality of levels adjacent each other.

3. That method for the conversion of hydrocarbons in the presence of a particle form solid contact mass material which comprises moving the contact mass through a confined reaction zone as a compact downwardly flowing column, passing reactants at reaction conditions longitudinally through said column and concurrently therewith, and separating reactant from contact mass near the bottom of said column, in which the reactants are separated from contact mass at a disengaging surface the total area of which is substantially greater than the cross sectional area of the said column, in which the disengaging surface is distributed at a plurality of levels adjacent each other, and in which the amount of reactant permitted to separate in any level of disengaging surface above the bottommost is throttled back to a maximum flow substantially less than the free flow from the bottommost level of disengaging surface.

4. That method for the conversion of hydrocarbons in the presence of a particle form solid contact mass material which comprises moving the contact mass through a confined reaction zone as a compact downwardly flowing column, passing reactants at reaction conditions longitudinally through said column and concurrently therewith, and separating reactant from contact mass near the bottom of said column, in which the reactants are separated from contact mass at a disengaging surface the total area of which is substantially greater than the cross sectional area of the said column, in which the disengaging surface is distributed at a plurality of levels adjacent each other, and in which the flow from any level of disengaging surface above the bottommost is throttled to a maximum of about 85 per cent of the free flow from the bottommost level of disengaging surface.

5. Apparatus for hydrocarbon conversion comprising a vertical shell defining a confined reaction space, means to feed particle form solid contact mass material to the top thereof to maintain therein a substantially compact, downwardly moving column of said contact mass material, means to remove contact mass material from the bottom thereof, means to introduce reactant thereto adjacent the top of said column, and means to remove reactant therefrom at a point near the bottom of said column, the said removal means consisting of a plurality of disengaging surface creating means distributed across the column and in a plurality of adjacent levels near its bottom, the total area of said disengaging surfaces being substantially in excess of the cross sectional area of the column, and conduit means to lead disengaged reactant from the reactor, the conduit means for each level of disengaging space being common, and these conduit means being manifolded, in which throttling devices are installed on the several conduit means to proportion the amount of reactant discharged among the several levels.

6. A method for the conversion of hydrocarbons in the presence of a particle form solid contact mass material which comprises moving particle form solid contact mass material through a confined reaction zone as a substantially compact column of downwardly moving particles, passing reactants at controlled reaction conditions longitudinally through said column and concurrently therewith, separating reactant and contact mass at a plurality of disengaging surfaces provided at a plurality of vertically spaced levels within the lower section of said column, said disengaging surfaces providing substantially greater area than the cross sectional area of said column and withdrawing disengaged reactant from each of said levels while separately throttling the rate of said reactant withdrawal from at least all of said levels above the lowermost level.

7. Apparatus for hydrocarbon conversion comprising a vertical shell defining a confined reaction space, means to feed particle form solid contact mass material to the top thereof to maintain therein a substantially compact, downwardly moving column of said contact mass material, means to remove contact mass material from the bottom thereof, means to introduce reactant thereto adjacent the top of said column, a plurality of disengaging surface creating means distributed across said shell at a plurality of spaced vertical levels near the bottom thereof, said disengaging surface creating means being adapted to provide a total disengaging surface area greater than the internal cross sectional area of said shell, separate conduit means associated with said disengaging surface creating means at each level for withdrawal of disengaged reactant from each level and flow throttling devices on the conduit means at at least each level above the lowermost level of disengaging surface creating means to proportion the amount of reactant discharged at the several levels.

THOMAS P. SIMPSON.
RUSSELL LEE.
FREDERICK E. RAY.

REFERENCES CITED

The following references are of record in the file of this patent:

UNITED STATES PATENTS

| Number | Name | Date |
|---|---|---|
| 695,004 | Speer | Mar. 11, 1902 |
| 1,174,464 | Agnew | Mar. 7, 1916 |
| 1,784,536 | Pantenburg | Dec. 9, 1930 |
| 1,852,227 | Barstow et al. | Apr. 5, 1932 |
| 2,298,593 | Rubin | Oct. 13, 1942 |
| 2,302,328 | Kelly | Nov. 17, 1942 |
| 2,303,717 | Arveson | Dec. 1, 1942 |
| 2,312,006 | Thiele | Feb. 23, 1943 |
| 2,320,147 | Layng et al. | May 25, 1943 |

FOREIGN PATENTS

| Number | Country | Date |
|---|---|---|
| 492,753 | Germany | Feb. 27, 1930 |